United States Patent [19]

Luchinger et al.

[11] 4,155,412

[45] May 22, 1979

[54] TOP-LOADING BALANCE

[75] Inventors: Paul Lüchinger, Greifensee; Ernst Strickler, Wolfhausen, both of Switzerland

[73] Assignee: Mettler Instrumente AG, Greifensee, Switzerland

[21] Appl. No.: 848,947

[22] Filed: Nov. 7, 1977

[30] Foreign Application Priority Data

Feb. 22, 1977 [CH] Switzerland ............................. 2177/77

[51] Int. Cl.² ........................ G01G 23/14; G01G 21/22
[52] U.S. Cl. ........................................ 177/165; 177/262
[58] Field of Search ............... 177/164, 165, 260, 262, 177/264

[56] References Cited

U.S. PATENT DOCUMENTS

| 25,203 | 8/1859 | Kelly | 177/262 |
|---|---|---|---|
| 1,667,891 | 5/1928 | Hapgood | 177/262 |
| 1,685,793 | 10/1928 | Wetzel | 177/262 |

FOREIGN PATENT DOCUMENTS

| 649896 | 10/1962 | Canada | 177/262 |
|---|---|---|---|
| 109660 | 2/1944 | Sweden | 177/262 |

Primary Examiner—George H. Miller, Jr.
Attorney, Agent, or Firm—Hans Berman

[57] ABSTRACT

The pan assembly of a top-loading balance consists of a base attached to a pan carrier for joint movement in a vertically extending direction relative to a support on which the carrier is mounted. A sensible signal is generated in response to the presence of an object to be weighed on the pan assembly which, according to the invention, includes a cover spacedly superposed on the base and having a horizontally extending, exposed top face for receiving the object. One or more compensating weights are releasably interposed between the cover and base in weight transmitting relationship, the cover, the weights, and the base being closely similar in configuration when viewed from above and releasably secured to each other by interengaged projections and recesses.

6 Claims, 2 Drawing Figures

U.S. Patent  May 22, 1979  4,155,412
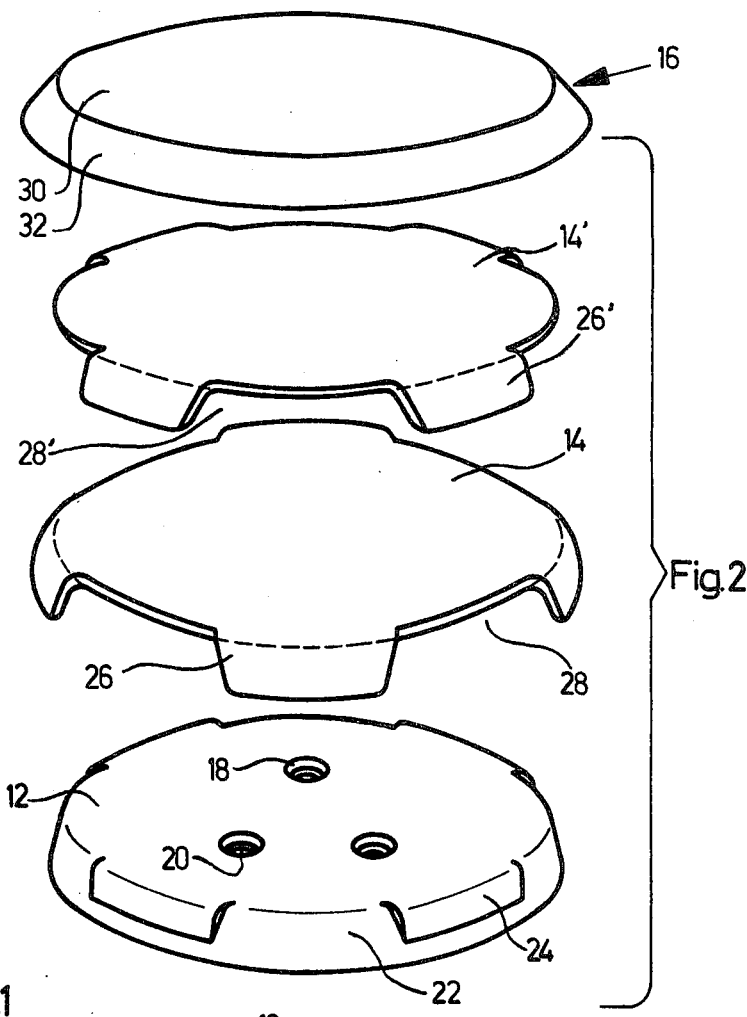
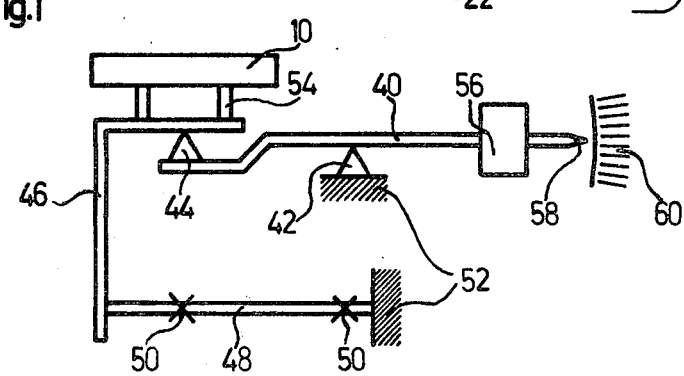

TOP-LOADING BALANCE

This invention relates to top-loading balances, and particularly to a top-loading balance having an improved weighing pan assembly.

It is common practice to provide a top-loading precision balance with a two-part pan assembly. A base is fixedly fastened to a pan carrier which is mounted on the stationary supporting structure of the balance for movement in a path having a predominant vertical component. A cover having an exposed, horizontally extending top face is releasably set on the base and carries the object to be weighed. A sensible signal is generated in response to the presence of the object on the cover and indicates the weight of the object.

The range of weights that can be determined by such a balance is usually limited by design features, not directly relevant to this invention and well known in themselves. The useful weighing range can be expanded by providing removable weights connected to the pan assembly for joint movement, but the known arrangements of removable weights, so-called substitution weights, are relatively complex, costly, and bulky. In many instances, substitution weights are employed only for compensating for tare, that is, the weight of containers holding the material to be weighed, the magnitude of such tare not being of interest in itself.

It is a primary object of this invention to provide a top-loading precision balance with substitution weights which permit tare to be compensated for, yet do not significantly increase the cost, complexity, and bulk of the balance.

With this object and others in view, as will presently become apparent, the invention provides a balance of the general type described with a weighing pan assembly including a base attached to a pan carrier in a manner known in itself. A cover is spacedly superposed on the base and has the usual, horizontally extending, exposed top face for receiving the object to be weighed. At least one compensating weight is releasably interposed between the base and cover in weight transmitting relationship. The cover and the compensating weight are closely similar in configuration when viewed from above so that the compensating weight does not significantly increase the bulk of the balance.

Other features, additional objects, and many of the attendant advantages of this invention will readily be appreciated as the same becomes better understood by reference to the following detailed description of a preferred embodiment when considered in connection with the appended drawing in which:

FIG. 1 shows a precision balance equipped with the pan assembly of this invention in fragmentary side-elevation, the elements of the balance being indicated by conventional symbols; and FIG. 2 shows the pan assembly of the balance of FIG. 1 in an exploded, perspective view.

Referring initially to FIG. 1, there is shown only as much of a generally conventional balance as is needed for an understanding of the invention. A balance beam 40 is supported on a main, knife-edge bearing 42. An outer bearing 44 on one arm of the beam 40 supports an upper horizontal arm of a pan carrier 46. The two ends of a linking rod 48 are fastened by respective flexible connectors 50 to a lower horizontal arm of the pan carrier 46 and to the stationary supporting structure 52 of the balance, such as a casing, which also supports the main bearing 42, the bearings 42,44 and the connectors 50 being arranged in a known manner so that the upper arm of the pan carrier 46 remains horizontal and moves in a predominantly vertical path when the beam 40 pivots on the main bearing 42. The other arm of the beam 40 is provided with a counterpoise 56 and a pointer 58 which sweeps a scale 60 on the casing 52 to indicate the weight of an object on a weighing pan assembly 10 attached to the upper arm of the carrier 46 by three partly threaded pins 54.

The weighing pan assembly 10 is shown in FIG. 2 on a larger scale in an exploded, perspective view. It consists of a base 12, two compensating or substitution weights 14,14', and a cover 16 which are stacked in the operative condition illustrated in FIG. 1 in such a manner that the weight of the cover 16 and of a non-illustrated object supported thereby is sequentially transmitted by the weights 14,14' to the base 12, and thereby to the pan carrier 46.

The base 12 is a generally circular, unitary metal disc whose flat top face is provided with three conical orifices 18 equiangularly spaced about the vertical axis of the base and leading into axial bores 20. The pins 54, not shown in FIG. 2, normally extend from the orifices 18 through the bores 20 into the pan carrier 46 to attach the base 12 to the pan carrier 46. The bottom face of the base 12, not itself seen in FIG. 2, is flat and parallel to the top face, but slightly larger in diameter. The circumferential face 22 which connects the top and bottom faces flares conically in a downward direction. Four low, integral ribs or beads 24 project from the face 22 adjacent the top face in a radially outward direction, each rib extending circumferentially in an arc of approximately 45°. Each pair of circumferentially consecutive ribs 24 thus bounds a circumferential gap or recess of an arcuate length similar to that of the ribs.

The two compensating weights 14,14' are identical, unitary, sheet metal structures of uniform thickness, much smaller than that of the base 12. The central portion of each weight 14,14' is a flat, circular disc. Four lugs 26 depending from the central portion of the weight 14 are circumferentially distributed and jointly define a conical surface whose apex is located in the common axis of the base 12, the weights 14,14', and the cover 16. They are separated circumferentially from each other by recesses 28 in which the narrow edge of the central disc portion is exposed. The lugs 26 and the recesses 28 have respective circumferential lengths of approximately 45°, and the apex angle of the conical surface defined by the lugs 26 is equal to the apex angle of the circumferential face 22 of the base 12. The diameters of the central portion of the weight 14 and of the top face of the base 12 are closely similar so that the base 12 and the weight 14 present almost the same top view, and the weight 14 can be set on the base 12 with the lugs 26 received between the ribs 24, and the ribs 24 at least partly received in the recesses 28.

In the normal operative condition of the pan assembly 10, the additional compensating weight 14' is offset 45° from the weight 14 on which it is set in weight transmitting relationship, the lugs 26' of the weight 14' being received in the recesses 28, and the lugs 26 being aligned with the recesses 28' of the additional weight 14'. The weights 14,14' thus are precisely centered on the base 12 in fixed angular positions.

The cover 16 is a unitary sheet metal element similar to the weights 14,14'. Its exposed, circular, load-receiving top face 30 is flat and normally horizontal and approximately equal in diameter to the top face of the additional weight 14' on which the bottom face of the cover 12 rests in the normal operating condition of the pan assembly. An annular skirt 32 flares conically downward from the top face 30 at an apex angle approximately equal to the corresponding angles of the lugs 26',26, and of the circumferential face 22. When the cover 16 is seated on the weight 14', the skirt 32 partly envelops the lugs 26' and thereby centers the cover 16 on the base 12.

While two compensating weights 14,14' have been illustrated by way of example, more than two such weights of identical shape may be interposed between the base 12 and the cover 16 and removed manually in a few seconds to adjust the precision weighing range of the balance for the weight of a container or other tare. The manner in which a sensible signal indicative of the weight of an object placed on the top face 30 of the cover 16 is generated, and the nature of the signal are not in themselves relevant to this invention, and a pointer on a balance beam sweeping a fixed scale has been shown in FIG. 1 merely by way of example. The pan assembly of the invention is equally applicable to all other single-pan balances and may be found convenient even in balances equipped with a beam and with a pan on each arm of the beam. It has been found particularly advantageous in toploading balances with electromagnetic compensation of the weight of the load, such as the balance disclosed in U.S. Pat. No. 3,786,884.

The apex angle of the several conical surfaces defined by the face 22, the lugs 26,26', and the skirt 32 is 90°, but a different common apex angle may be chosen. It permits the cover 16 to be set directly on the base 12 after removal of all weights 14,14'. Almost equally precise centering of the several elements of the pan assembly can be achieved if the apex angle of the face 22 is smaller than that of the skirt 32, and the apex angles of the lugs 26,26' are intermediate in magnitude though preferably identical to permit the weights 14,14' to be set on the base 12 in any vertical sequence.

A precise circumferential fit of the lugs 26,26' in the recesses 28 and the gaps between the ribs 24 is not essential to proper operation of the pan assembly, and some clearance is preferred for ease of assembly. For the same reason, the lugs 26,26' decrease in circumferential width from the corresponding central portions of the weights 14,14' toward their free edges.

What is claimed is:

1. In a balance including a support, a pan carrier mounted on said support for movement in a vertically extending direction, a weighing pan assembly on said carrier, and means for generating a sensible signal in response to the presence of an object to be weighed on said assembly, the improvement in said assembly which comprises:
   (a) a base member attached to said pan carrier;
   (b) a cover member spacedly superposed on said base member and having an exposed top face extending horizontally during said movement; and
   (c) a compensating weight releasably interposed between said members in weight transmitting relationship,
      (1) said cover member and said weight being closely similar in configuration when viewed in said direction.

2. In a balance as set forth in claim 1, said base member and said weight having respective disc-shaped central portions, a plurality of alternating projections and recesses being distributed about the circumference of each of said disc shaped portions, the projections of said weight being received in the recesses of said base member.

3. In a balance as set forth in claim 2, said central portions being of approximately equal size and shape.

4. In a balance as set forth in claim 3, said central portion of said weight having a circular top face about an axis extending in said direction, said projections of said weight extending from said top face in a conical surface having an apex in said axis and flaring from said top face toward said base member.

5. In a balance as set forth in claim 2, an additional weight substantially identical in size and shape with said compensating weight and releasably interposed between said compensating weight and said cover member in weight transmitting relationship, the projections of said additional weight being received in the recesses of said compensating weight.

6. In a balance as set forth in claim 5, said top face of said cover member being planar, and said cover member including an annular skirt portion depending from the circumference of said top face and flaring toward said base member, the central portion and the projections of said additional weight being partly enveloped by said skirt portion.

* * * * *